United States Patent
Morales

(10) Patent No.: US 11,288,555 B1
(45) Date of Patent: Mar. 29, 2022

(54) METHODS AND SYSTEM FOR IMPLEMENTING QUALITY CONTROL OF COLOR PRINTING

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/204,101

(22) Filed: Mar. 17, 2021

(51) Int. Cl.
*G06F 3/12* (2006.01)
*G06K 15/02* (2006.01)
*G06K 15/12* (2006.01)
*G06K 15/00* (2006.01)

(52) U.S. Cl.
CPC ......... *G06K 15/021* (2013.01); *G06F 3/1209* (2013.01); *G06K 15/129* (2013.01); *G06K 15/4065* (2013.01)

(58) Field of Classification Search
CPC .............. G06K 15/021; G06K 15/129; G06K 15/4065; G06F 3/1209

USPC .......................................................... 358/1.9
See application file for complete search history.

(56) References Cited

U.S. PATENT DOCUMENTS

| | | | |
|---|---|---|---|
| 2014/0146331 A1* | 5/2014 | Sato ................... | H04N 1/00087 358/1.9 |
| 2014/0176969 A1* | 6/2014 | Yano .................. | G06K 15/1868 358/1.9 |
| 2018/0189617 A1* | 7/2018 | Feng .................. | G06K 15/4025 |

* cited by examiner

*Primary Examiner* — Allen H Nguyen
(74) *Attorney, Agent, or Firm* — Millen, White, Zelano & Branigan, P.C.; William Nixon

(57) ABSTRACT

A color printing system implements quality control for processing color print jobs by performing a quality control operation on a printing device. The printing device is queried whether a calibrated paper is loaded on the printing device. The calibrated paper includes a media or paper type. Several calibrated papers can be loaded on the printing device. A confirmation is done that the calibrated paper is available according to a defined rule. The defined rule relates to the media or paper type. A quality check print job is submitted to the printing device to be printed on the calibrated paper. The quality control operation is performed using the quality check print job.

20 Claims, 6 Drawing Sheets

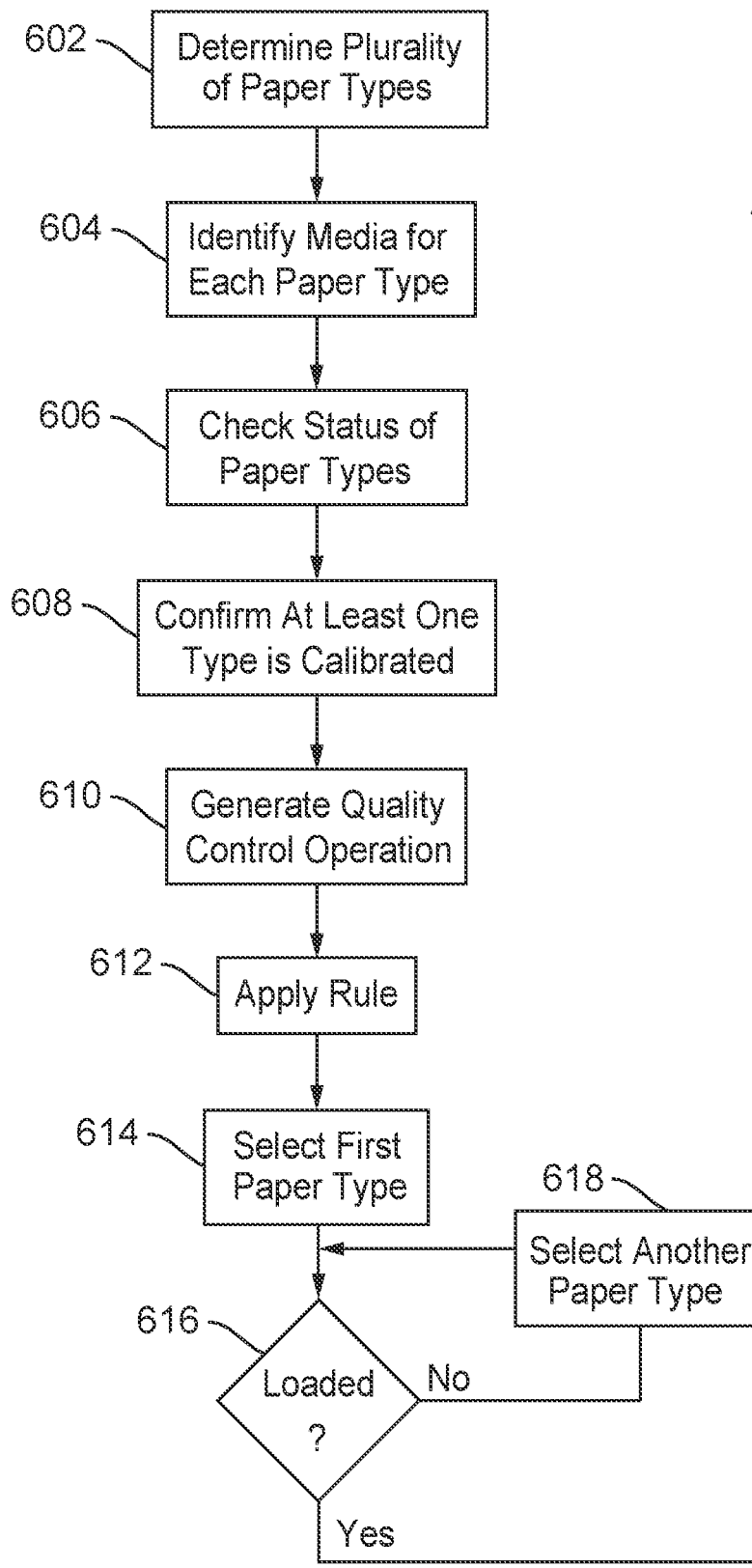
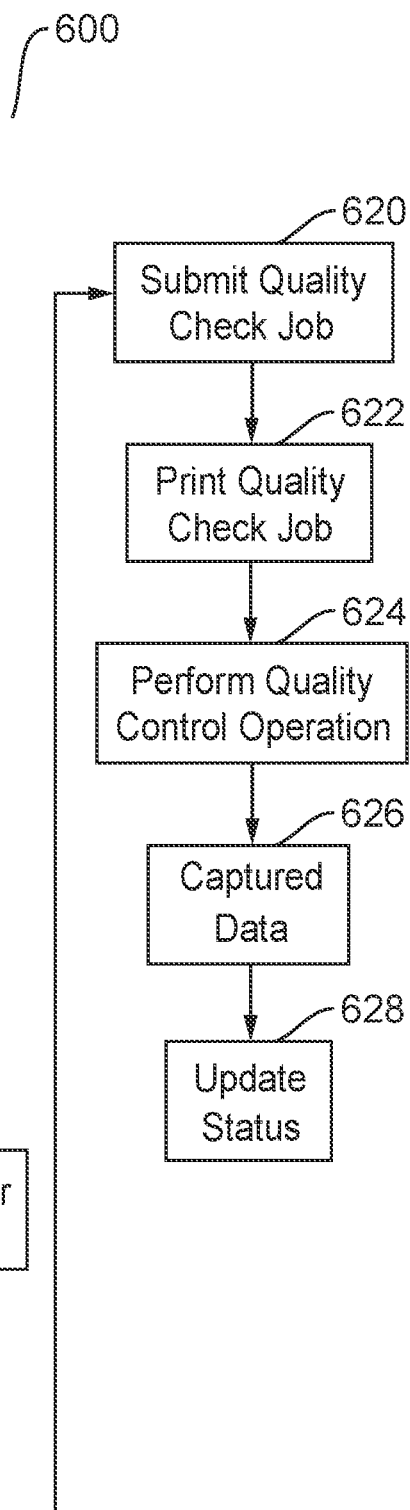
Fig. 6

METHODS AND SYSTEM FOR IMPLEMENTING QUALITY CONTROL OF COLOR PRINTING

FIELD OF THE INVENTION

The present invention relates to implementing processes for quality control of color printing resources within a printing device.

DESCRIPTION OF THE RELATED ART

Color management is one of the more complex aspects of color printing. Two operations may be performed for production print color management, calibration and ICC profile creation. In color management, an ICC profile is a set of data that characterizes a color input or output device, or a color space, according to standards promulgated by the International Color Consortium (ICC). Calibration provides a stable foundation on which ICC profiling can be implemented. Calibration may be relatively straight-forward as opposed to ICC profile creation. Calibration linearizes color printing device response so that individual color ramps, or colors in 10% increments from 10%-100%) are evident.

Color management for production printing results in the creation and management of color management resources, such as the calibration TRCs and ICC profiles. A printing device color reproduction response drifts over time, it may be a challenge to ensure that all of the color management resources remain valid and able to produce the expected results. Print shops struggle to perform color management tasks. Color management activities, from calibration and ICC profile creation to ongoing quality checks, are overhead. These activities do not generate any revenue for the print shop. Busy print shops, in particular, may struggle to perform quality control operations as the time required to do so takes away from time that could be used to print color print jobs, which generate revenue. For these reasons, it may be difficult for the print shop to perform the required quality control operations consistently to ensure predictable color output unless the print shop adheres strictly to quality control procedures.

SUMMARY OF THE INVENTION

A method for implementing quality control for color printing is disclosed. The method includes determining a quality control operation is to be performed on a printing device. The method also includes querying the printing device whether a calibrated paper is loaded within the printing device. The calibrated paper includes a media type. The method also includes confirming the calibrated paper is available for the quality control operation according to a defined rule. The method also includes submitting a quality check job for the quality control operation to the printing device. The method also includes printing the quality check job on the calibrated paper at the printing device. The method also includes performing the quality control operation using the calibrated paper.

A method for performing quality control operations for a plurality of paper media according to the disclosed embodiments. The method includes determining a printing device includes a plurality of types of paper. Each type of paper corresponds to a paper media. The method also includes confirming at least one of the plurality of types of paper is calibrated. The method also includes selecting a quality control operation for a first type of paper according to a defined rule. The defined rule relates to the paper media of the first type of paper. The method also includes submitting a quality check job for the quality control operation to the printing device. The method also includes printing the first type of paper according to the quality check job. The method also includes performing the quality check operation using the first type of paper.

A color printing system is disclosed. The color printing system includes a server configured to select a quality control operation from a printing device. The color printing system also includes the printing device having a paper media type. The server is further configured to determine the quality control operation is to be performed on the printing device. The server is further configured to query the printing device whether a calibrated paper of the paper media type is loaded within the printing device. The server is further configured to confirm the calibrated paper is available for the quality control operation according to a defined rule. The server is further configured to submit a quality check job for the quality control operation to the printing device. The printing device is configured to print the quality check job on the calibrated paper. The printing device is further configured to perform the quality control operation using the calibrated paper.

BRIEF DESCRIPTION OF THE DRAWINGS

Various other features and attendant advantages of the present invention will be more fully appreciated when considered in conjunction with the accompanying drawings.

FIG. 6 illustrates a flowchart for performing quality control operations for a plurality of paper media according to the disclosed embodiments.

DETAILED DESCRIPTION OF THE PREFERRED EMBODIMENTS

Figure 1:
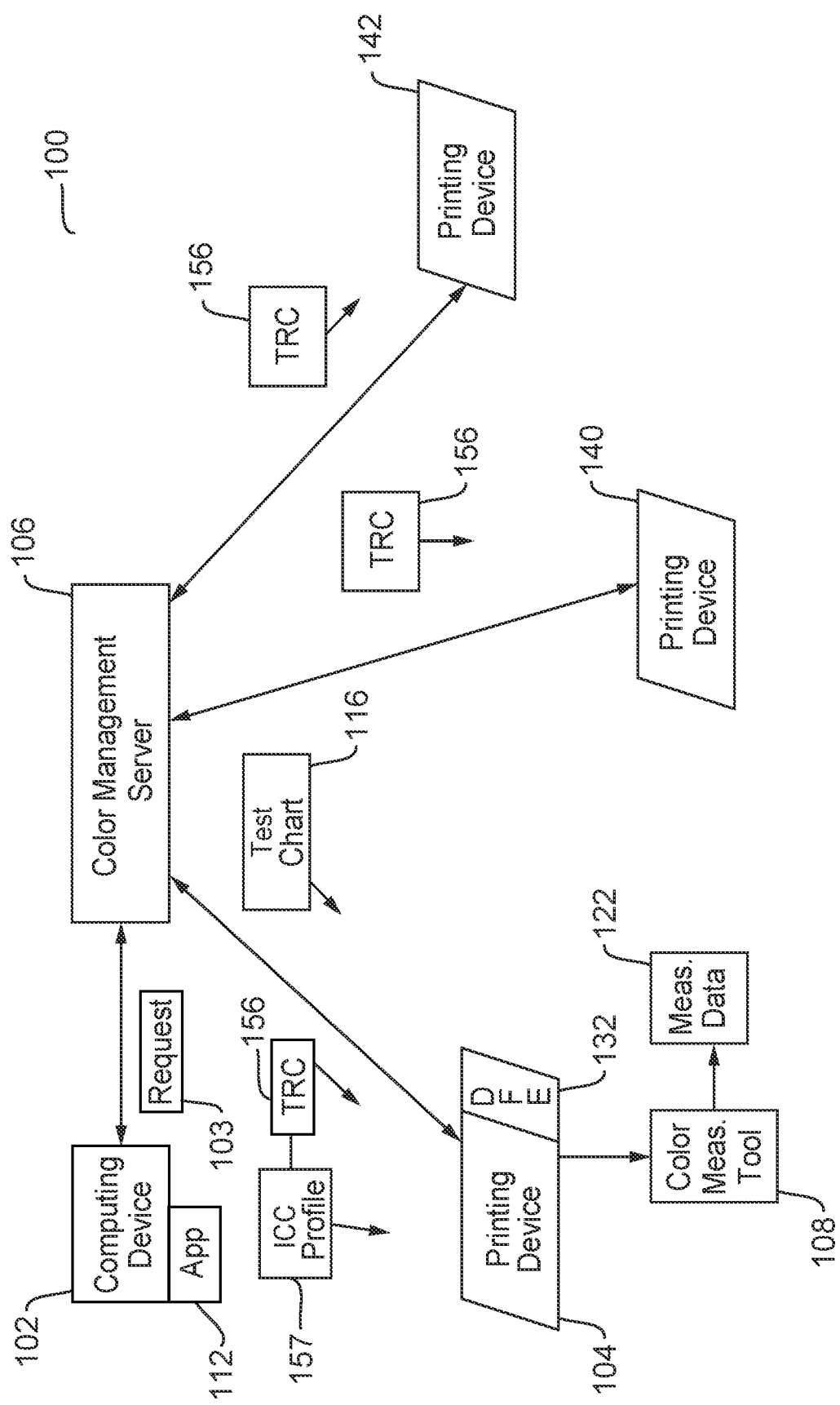
FIG. 1 illustrates a block diagram of a color management system for printing devices according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet.

Control strip—a test color strip that also contains encoded information.

Target print job—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments allow more intelligent management of color resources within a printing system. The disclosed embodiments retain metadata about color management resources that may be used to provide more intelligent interactions between color management resources. These features would be enabled for both calibration TRCs and ICC profiles. When calibrating a printing device, the system prints a test chart with colorant ramps. The colorant ramps are used to define the TRC for each colorant as part of known printing device calibration.

The disclosed embodiments streamlines operations for an operator in a color print shop in a number of ways. The operator does not have to worry about managing the inspections of different papers being used in a printing device. The operator does not need to waste time scheduling quality checks or inspections to ensure available papers are considered. Disruption to print production is minimal as the printing system does not require changing papers loaded at the printing device beyond what is needed to produce revenue generating work.

When a printing system determines that a quality control operation is required, the printing system may query the printing device for loaded papers. If there is a loaded paper that has been calibrated, then the printing system may submit the quality control operation using that paper. If there are multiple loaded papers that have been calibrated, then the printing system may select a loaded paper based on user-defined rules. These rules may be set forth in a quality control policy for the printing device.

If there are no calibrated papers loaded at printing device, then the printing system may look at the job queue in the digital front end of the printing device to determine if there are print jobs that use a calibrated paper. If there is no job that uses a calibrated paper, then the printing system may monitor the job queue to check when a print job is received that uses a calibrated paper. If a calibrated paper is not loaded or not indicated in a print job within a timeframe defined in the quality control policy, then the printing system may select a calibrated paper using the defined rules. The operator will load the calibrated paper at the printing device and the quality check operation submitted to the printing device.

The printing system also may ignore loaded papers for papers used by a print job in the queue, if, per the quality control policy, a specific paper type has not been checked within the required timeframe. Once a quality control operation is submitted to the printing device, the applicable quality check print job will be printed. The printed document is measured per known color management workflows. It should be noted that a color management server may perform these functions in conjunction with the printing device. The color management server is within the color printing system.

FIG. 1 depicts a color management system 100 for printing devices 104, 140, and 142 according to the disclosed embodiments. Color management system 100 includes a color management server 106. Color management server 106 may be a server that registers all printing devices within system 100 and controls color management operations for the printing devices. In some embodiments, color management system 100 may be a system or network within a print shop having several or more printing devices.

Printing devices 104, 140, and 142 may receive print jobs from color management server 100. They also may receive calibration print jobs and quality checks from color management server 100. Test chart 116 may be generated to perform calibrations, disclosed in greater detail below. Other items and data files may be sent to printing devices 104, 140, and 142. Further, the printing devices may provide data and information to color management server 106 so that it may manage color printing operations within system 100.

In some embodiments, computing device 102 may include an application 112 that generates data for printing that is sent to color management server 106. Color management server 106 also may exchange data with printing device 104 for performing calibration operations, specifically color calibration. Color management server 106 is a server that manages print jobs and tasks between a plurality of printing devices 104, 140, and 142. Color management server 106 also provides calibration operations to the printing devices. An operator may perform calibration tasks for the plurality of printing devices using color management server 106 using computing device 102. In some embodiments, computing device 102 is incorporated with color management server 106.

Preferably, color management server 106 allows for inspection, calibration, and profiling for management of color print jobs. Color management server 106 may act as a software as a service (SaaS) solution that provides color management. The service enables repeatable color reproduction at the printing devices. Color management server 106 also may manage digital front ends (DFEs) from production printing which include paper catalogs. These paper catalogs may include paper measurements and paper color measurement profiles. For example, printing device 104 includes DFE 132.

In some embodiments, an operator may request calibration for printing device 104 within system 100. The user may utilize application 112 on computing device 102 to generate calibration request 103 for printing device 104. Calibration request 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches. Thus, the user may generate and send a large number of requests for calibrations of these different types of papers at once.

Color management server 106 receives calibration request 103 within system 100. Color management server 106 generates a test chart 116 to obtain measurement data for the paper at printing device 104. Test chart 116 includes color patches used to perform calibration operations. Test charts 116 may use colorant ramps for each colorant. Test chart 116 is forwarded to printing device 104, which prints it out on the indicated paper/media type. An operator takes test chart 116. The operator may use color measurement tool 108 to measure the color patches on test chart 116 to obtain measurement data 122. Alternatively, printing device 104 may include inline measurement tools that automatically measure the color patches within test chart 116.

The operator or printing device measures calibration chart 116 after it is printed out at the printing device. Measurement data 122 is captured by measuring the color patches and the printed colors associated therewith. The data is provided back to color management server 106 for analysis. Using the measured data, color management server 106 generates calibration tone reproduction curves (TRCs) 156 using calibration settings that may be set by the operator or system 100. Calibration settings may include end point targets and aims for the colors. Once the calibration TRCs 156 are created, they are downloaded to the printing device or devices. Alternatively, if calibration is implemented at the printing device, then calibration TRCs 156 may be stored in digital front end (DFE) 132. In some embodiment, a TRC 156 may be stored in multiple printing devices within system 100. Calibration TRCs 156 also may be associated with ICC profile 157 that is sent to printing device 104. ICC profile 157 may be built upon calibrated output such as measurement data 122.

Figure 2:
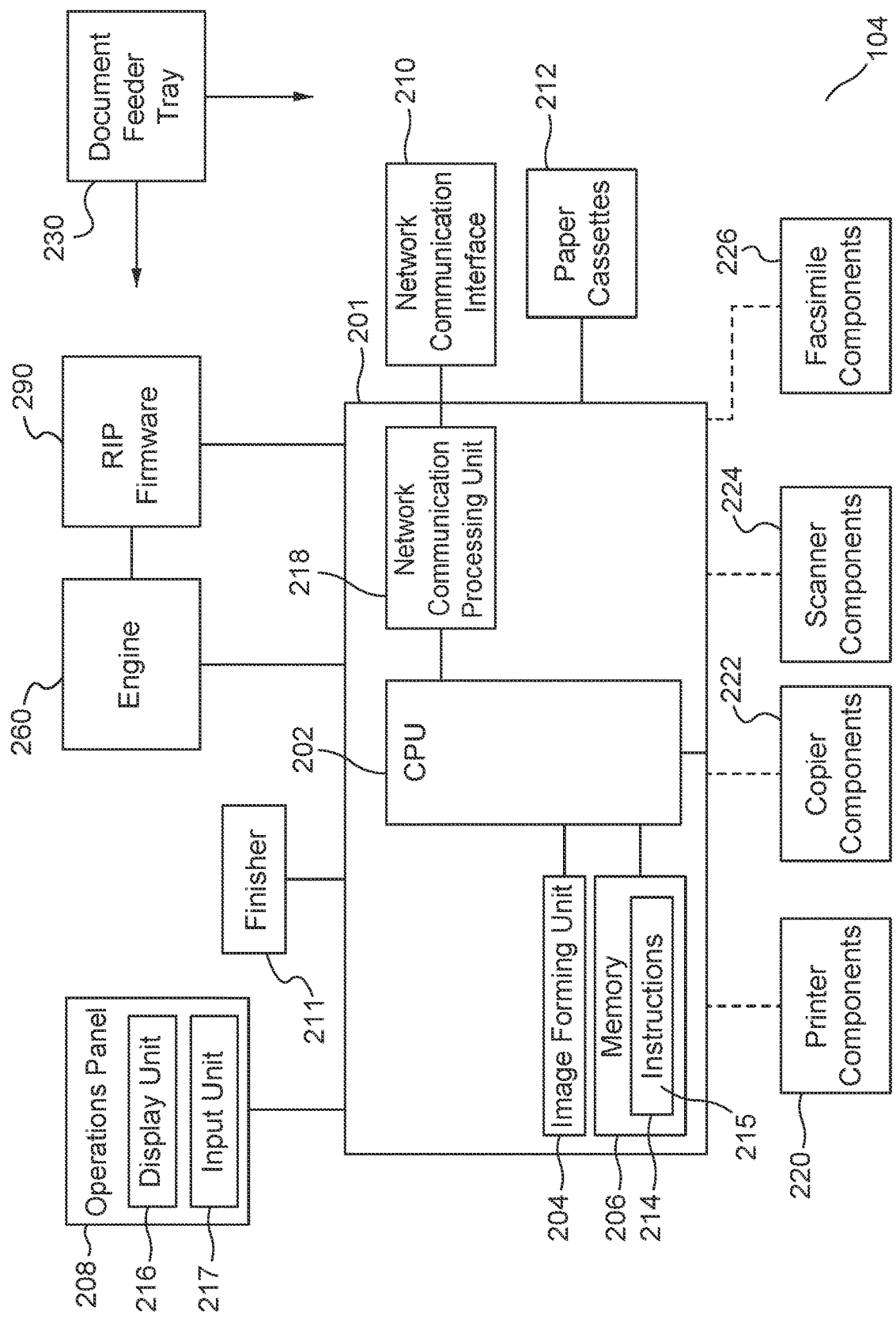
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management server 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with color management server 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management server 106.

Figure 3:
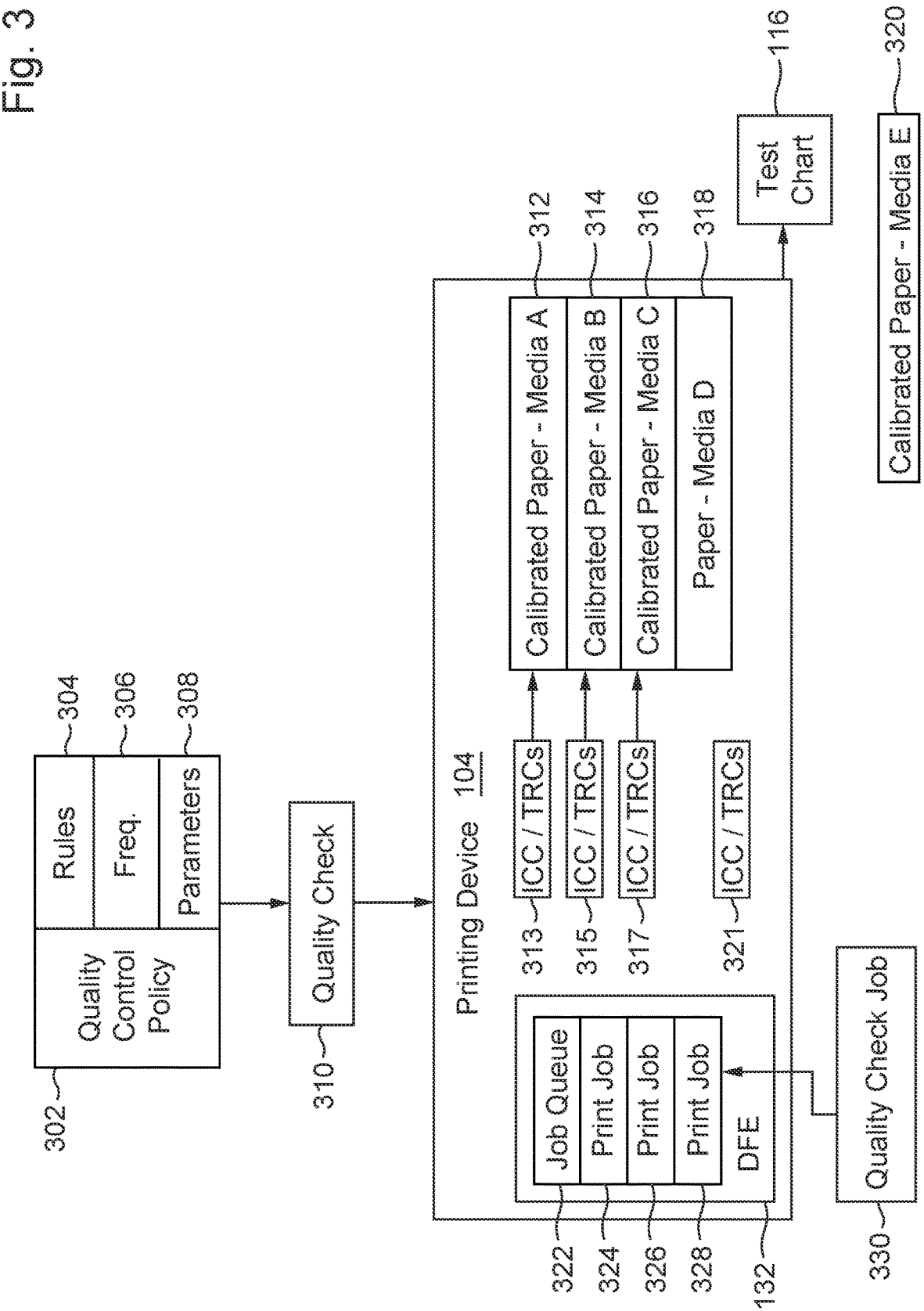
FIG. 3 illustrates a block diagram of the use of a quality control policy with a printing device within the color management system according to the disclosed embodiments.

FIG. 3 depicts a block diagram of the use of a quality control policy 302 with a printing device 104 within system 100 according to the disclosed embodiments. Quality control policy 302 may be defined for each printing device for performing quality control operations using quality checks 310. A quality control policy may be defined for printing devices 104, 140, and 142. Each quality control policy differs from the others depending on the specific printing device. For example, printing device 104 may not have an A4 paper printing capability while printing device 140 does. Thus, quality control policy 302 for printing device 104 does not have any rules or parameters regarding A4 paper quality checks but the quality control policy for printing device 140 does have such rules or parameters.

Quality control policy 302 includes rules 304, frequency 306, and parameters 308. Other features may be included as well. Quality control policy 302 may specify frequency 306 for checking that the color reproduction for printing device 104 is still within desired parameters 308, such as tolerances. In addition, quality control policy 302 may specify a window for performing quality checks 310 as a rule 304. For example, system 100 or an operator may specify that quality checks 310 be done at a frequency 306 of once a day between 7-11 am.

Quality control policy 302 also may specify a rule 304 that printing device 104 rotate quality checks 310 between different paper types. In addition, a rule 304 may specify a maximum time between quality control checks 310 for each paper type. For example, printing device 104 may be checked once a day but a rule 304 may indicate each paper type has a frequency 306 of being checked at least once a week. As disclosed below, color management server 106 may take into account features and information from printing device 104 in determining what operations to perform with quality check 310.

According to rules 304 and frequency 306, color management server 106 determines that a quality control operation is required. Thus, color management server 106 queries printing device 104 for loaded papers. For example, printing device 104 may have one or more papers loaded from printing that have been calibrated. In other words, print calibration and ICC profile creation is completed for these paper types and available at printing device 104. Not every saved ICC profile may have a calibrated paper loaded at printing device 104. Further, not every loaded paper may have an available ICC profile to apply when color printing.

For example, printing device 104 may have calibrated paper 312, calibrated paper 314, and calibrated paper 316 loaded thereon. Papers may be loaded into paper trays, shown as paper cassettes 212 above. Each calibrated paper may correspond to a specific media. For example, calibrated paper 312 may correspond to media A, such as plain letter sized paper. Calibrated paper 314 may correspond to media B, such as coated paper. Calibrated paper 316 may correspond to media C, such as inkjet paper. These papers should be acceptable for color print jobs scheduled within system 100.

The loaded calibrated papers also correspond to one or more ICC profiles and calibration TRCs generated as disclosed above. For example, ICC profile and TRCs 313 relate to calibrated paper 312. ICC profile and TRCs 315 relate to calibrated paper 314. ICC profile and TRCs 317 apply to calibrated paper 316. When calibrated paper 312 is selected for a color print job, printing device 104 applies ICC profile and TRCs 315 for completing the printing operation to meet a desired output. The other ICC profiles and TRCs are applied accordingly, depending on the related calibrated paper.

Printing device 104 also may load paper 318 corresponding to media D, such as A4 paper. Paper 318 has not gone through calibration operations. Thus, it does not relate to an ICC profile or TRC. Paper 318 may be waiting for calibration operations to generate these items. Alternatively, system 100 may not plan to use A4 paper for color print jobs.

Calibrated paper 320 also is shown. When quality check 310 is being generated, calibrated paper 320 may not be loaded onto printing device 104. It may be available in the print shop but not loaded on the printing device. For example, printing device 104 may only have enough places for four paper cassettes, or trays. Calibrated paper 320 may be use rarely. Although not loaded, calibrated paper 320 does relate to an ICC profile and TRCs 321 that may be used when it is loaded onto printing device 104. Calibrated paper 320 may correspond to media E, such as legal sized paper.

Printing device 104 also includes a job queue 322 for print jobs received within system 100. Print jobs for processing and printing on printing device 104 may be scheduled within job queue 322 according to when received, priority, importance, availability of media, and the like. For example, job queue 322 includes print job 324, print job 326, and print job 328. Each print job may include one or more documents to be printed using one of the media types available at printing device. Within job queue 322, print job 324 may be the first one to be printed, followed by print job 326, then print job 328. If the requested paper media is not available for print job 324, then print job 326 or 328 may be moved within the queue for printing.

The disclosed embodiments may generate a quality check job 330 for quality check 310 into job queue 322. Quality check job 330 may result in test chart 116 being printed at printing device 104. Quality check job 330 is shown here to illustrate that a print job related to quality check 310 may be inserted into job queue 322 to complete a quality control operation.

Figure 4:
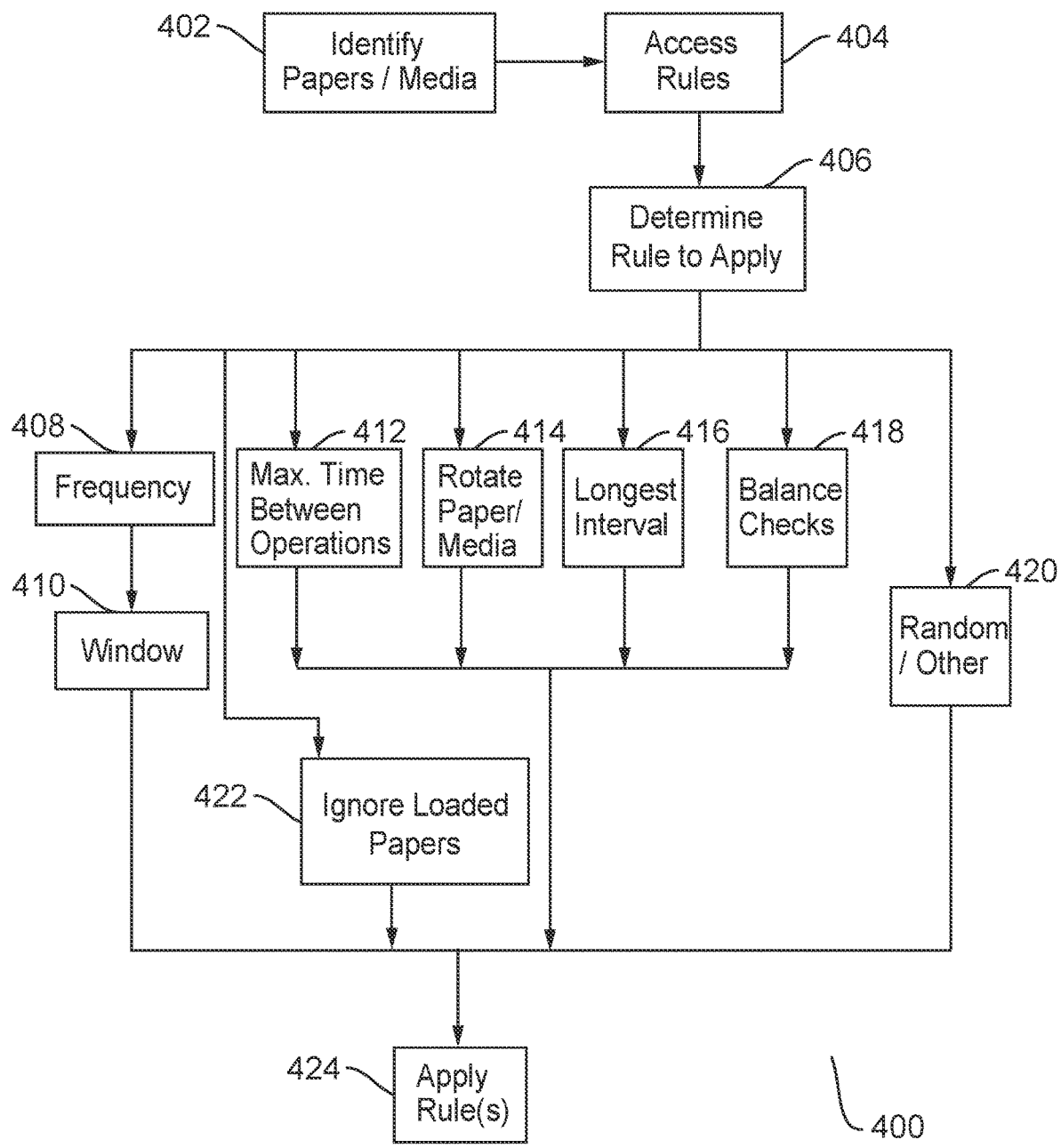
FIG. 4 illustrates a flowchart for determining a rule applicable to a quality control operation according to the disclosed embodiments.

FIG. 4 depicts a flowchart 400 for determining a rule 304 applicable to a quality control operation according to the disclosed embodiments. Flowchart 400 may refer to FIGS. 1-3 for illustrative purposes. The embodiments disclosed by flowchart 400, however, are not limited to the features of FIGS. 1-3. At some point during a quality control operation, one or more rules 304 may be applied to determine which paper to use, whether paper should be loaded to printing device 104, and the like. Flowchart 400 illustrates some of the rules that may be applied. The list, however, is not exhaustive and other rules may be applied by a quality control policy 302 for printing device 104.

Step 402 executes by identifying calibrated papers, loaded papers, and media types available to printing device 104. For example, printing device 104 may receive data from components detailing the amount of paper, paper type, paper that may be used at the printing device, and so on. Using FIG. 3 as an example, printing device 104 identifies calibrated paper 312 having media A, calibrated paper 314 having media B, calibrated paper 316 having media C, and paper 318 having media D as being loaded and available for printing operations. Printing device 104 also may identify calibrated paper 320 having media E as being available to print on the printing device but not loaded.

Step 404 executes by accessing rules 304 of quality control policy 302. Quality control policy 302 may be stored at printing device 104. Alternatively, it may be stored at color management server 106. Examples of rules 304 are disclosed below. Quality control policy 302 also may include frequencies 306 and parameters 308. Step 406 executes by determining which rule to apply to a quality control operation. Quality control policy 302 may define these rules based on how printing device 104 is configured and what papers and media types are available. Steps 408-422 disclose rules that may apply to a quality control operation.

Step 408 executes by defining a frequency with a rule 304 for checking color reproduction capability at printing device 104. For example, a frequency 306 of performing a quality control operation for each media type may be set for once a day. Alternatively, rule 304 may define that one quality control operation is performed once a day, regardless of media type. Rule 304 may define different frequencies 306 for quality control operations depending on media type. For example, calibrated paper 316 having media C may be used infrequently such that a quality control operation may be performed once a week as opposed to daily for the other calibrated papers. Rule 304 also may specify that printing device 104 rotate quality control operations between different paper or media types.

Step 410 executes by defining a window with a rule 304 for performing quality control operations at printing device 104. Quality control policy 302 may define a window for performing quality control operations. For example, quality control policy 302 may specify that operations and quality checks be performed between 7-10 am each day. Rule 304 may indicate that quality control operations are not to be performed outside this window. If color management server 106 submits a quality check 310 to printing device 104 at 1 pm, then printing device 104 will refer to quality control policy 302 and rule 304 to deny the request.

Step 412 executes by defining a maximum time between quality control operations with a rule 304. Maximum time may be considered a parameter 308 that is applied by rules 304. Quality control policy 302 a maximum time between quality control operations for each media type. For example, printing device 104 may checked once a day but each media type may be checked at least once a week. Though quality control policy 302 may impose frequencies 306 on doing operations but rule 304 may define a maximum time that overrides other factors. A calibrated paper that reaches the maximum time parameter is slotted to be included in the next quality control operation. Again, this parameter may be adjusted based on use of the media type by printing device 104. Using the above example, calibrated papers 312 and 314 may have a maximum time parameter of a week but calibrated paper 316 may have a maximum time parameter of once a month.

Step 414 executes by defining a rotation between calibrated papers with a rule 304 at printing device 104. This rule may apply when there are multiple sets of calibrated papers loaded on printing device 104. If only a single calibrated paper is loaded, then printing device 104 may perform a quality control operation on that paper with defining a rotation rule. If multiple calibrated papers are loaded, then quality control policy 302 may use a rule 304 that specifies that color management server 106 or printing device 104 rotate between different media types. In other words, application of rules 304 may indicate the same calibrated paper be used in quality control operations. Thus, a rule 304 may specify that the quality control operations rotate to ensure all media types are checked. The rotation may move sequentially through the loaded papers, subject to other rules 304 and parameters 308.

Step 416 executes by defining a longest interval selection with a rule 304 that is applied when rotating between different media types for quality control operations. As color management server 106 schedules a quality control operation between different calibrated papers, rule 304 may specify that color manager server 106 select the calibrated paper having the media type that has not been checked for the longest time interval. For example, calibrated paper 314 having media B may have the longest time interval since being checked so that quality check 310 specifies calibrated paper 314 to be checked.

Step 418 executes by defining that rotation occur with a rule 304 by using a system balance checks between quality control operations. Color management server 106 may balance quality control operations between different media types. Rule 304 may use different parameters 308 for balancing the operations. For example, balancing may be even between the different calibrated papers. Alternatively, color management server 106 may define preferred distribution of quality control operations by media types. For example, calibrated paper 312 having media A may be used twice as much as calibrated papers 314 and 316. Thus, quality control policy 302 may balance the number of operations to be twice those of the other papers, or 50% of selected operations. The remaining papers may be 25% each. In any distribution, color management server 106 or printing device 104 may select the calibrated paper that has been used for quality control operations the least number of times.

Step 420 executes by using a random selection of the calibrated paper with a rule 304 for quality control operations. Step 420 also may implement a rule 304 that the calibrated paper be selected based on tray priority. A pending print job may specify a media type. That media type may be selected for the quality control operation. Job queue 322 may be checked to identify a print job to select the calibrated paper for the quality control operation. Step 422 executes by ignoring loaded papers with a rule 304. Color management server 106 or printing device 104 may ignore loaded papers of papers used by a print job in job queue 322 if, per quality control policy 302, a specific media type has not been checked within the required timeframe. For example, calibrated paper 320 having media E may not have been checked for a month. Color management server 106 sends quality check 310 that specifies calibrated paper 320 even though it is not currently loaded to printing device 104. The operator may be instructed to load calibrated paper 320 to complete the quality control operation.

Step 424 executes by applying the one or more rules 304 when generating quality check 310 to printing device 104. Using rules 304 and quality control policy 302, the operators does not have to worry about the inspection of different papers or keep logs of checks. They also minimize disruption to quality control operations. A calibrated paper is selected for a quality check 310 using quality control policy 302 and applicable rules 304.

Figure 5:
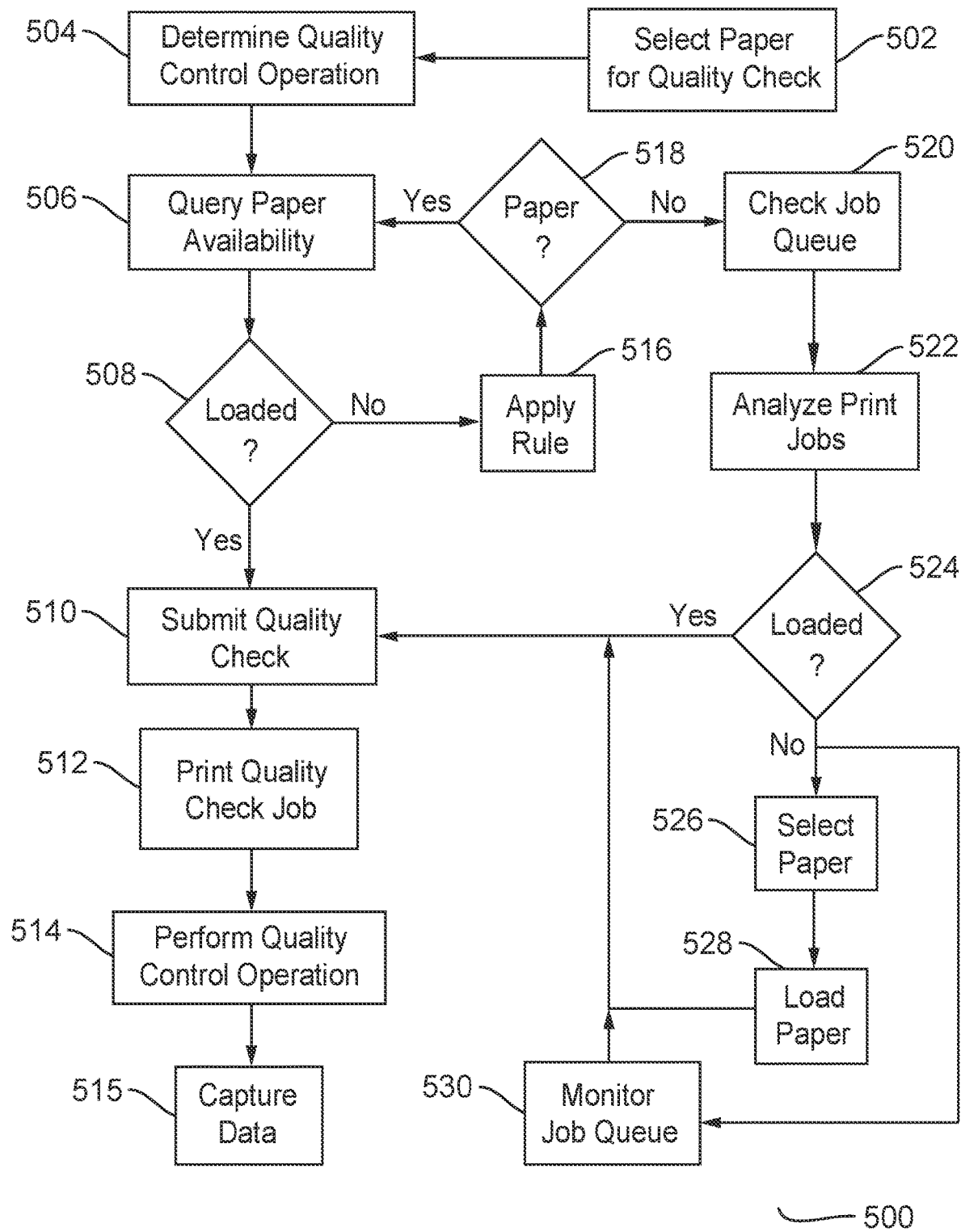
FIG. 5 illustrates a flowchart for implementing quality control for color printing at a printing device according to the disclosed embodiments.

FIG. 5 depicts a flowchart 500 for implementing quality control for color printing at printing device 104 according to the disclosed embodiments. Flowchart 500 may refer to FIGS. 1-4 for illustrative purposes. Flowchart 500, however, is not limited to the embodiments of FIGS. 1-4.

Step 502 executes by selecting a paper or media type for a quality check. Step 502 may apply one or more rules 304 to select which paper to check, as disclosed above. For example, step 502 may apply rules 304 of quality control policy 302 to select calibrated paper 314 having media B for a quality check 310. Step 504 executes by determining a quality control operation is to be performed with a quality check 310 at printing device 104. Steps 502 and 504 may be switched in flowchart 500.

Step 506 executes by querying paper availability for the quality control operation. Color management server 106, for example, may query printing device 104 for loaded papers. Specifically, it may query printing device 105 for calibrated paper 314. Step 508 executes by determining whether the selected paper is loaded on printing device 104. Using the above example, color management server 106 determines whether the query indicates that calibrated paper 314 is loaded on printing device 104.

If step 508 is yes, then step 510 executes by submitting quality check 310 for the quality control operation to printing device 104. Quality check 310 may include quality check job 330. Quality check job 330 may include a document for test chart 116, which is related to the quality control operation. Step 512 executes by printing quality check job 330 at printing device 104. For example, test chart 116 is printed out at the printing device on calibrated paper 314. Applicable TRCs and ICC profiles may be applied as set forth by the quality control operation. Step 514 executes by performing the quality control operation using test chart 116. For example, test chart 116 may include color patches that are measured to complete the quality control operation. Step 515 executes by capturing measurement data resulting from the quality control operation. This data may be analyzed to process the operation and its results whether the check is passed.

If step 508 is no, then step 516 executes by applying one or more rules 304 on how to handle non-availability of the selected paper at printing device 104. For example, a rule may specify that the operator load the selected paper to complete the quality control operation. Alternatively, it may cancel the quality control operation until another time. Other options may be to identify pending print jobs in job queue 322 to further select the paper for the quality control operation. Step 518 executes by determining whether the one or more rules 304 of quality control policy 302 indicate to load paper. If yes, then flowchart 500 proceeds back to step 506 to ensure the loaded paper is available.

If step 518 is no, then step 520 executes by checking job queue 322 of printing device 104 for pending print jobs. For example, job queue 322 may have pending print jobs 324, 326, and 328. Each print job may specify a paper or media type to be used to complete printing operations of the document. For example, print job 324 may use calibrated paper 314 having media B, print job 326 may use calibrated paper 316 having media C, and print job 328 may use calibrated paper 312 having media A. This information may be used to determine which paper to select for the quality control operation.

Step 522 executes by analyzing print jobs within job queue 322 to obtain information used to select which media type to check. Rules 304 may be applied as disclosed above to determine which print job, and, in turn, which media type, to use for the quality control operation. For example, a rule 304 may indicate calibrated paper 316 is due for a quality check because it has the longest time interval since its last check. Thus, print job 326 is indicated as using calibrated paper 314 having media C. Alternatively, the disclosed embodiments may simply select the media type specified by the first print job.

Step 524 executes by determining whether calibrated paper is loaded for the print job identified by the disclosed embodiments. For example, if the print job identified by color management server 106 or printing device 104 is one of the loaded calibrated papers, then flowchart 500 proceeds to step 510 to submit quality check 310 using this paper. In some embodiments, quality check job 330 is inserted adjacent to the print job to minimize paper switching. Thus, if print job 324 is selected to use as the basis for the quality control operation, then quality check job 330 may be placed adjacent to print job 324 in job queue 322. Adjacent means immediately before or after the subject print job. Flowchart 500 then may proceed as normal when quality check job 330 is processed by printing device 104.

If step 524 is no, then none of the print jobs call for paper currently loaded on printing device 104. For example, print jobs 324-28 may request media E of calibrated paper 320, which is not loaded on printing device 104. Thus, step 526 executes by selecting paper not loaded on printing device 104. Step 528 by loading the selected paper, such as calibrated paper 320, onto printing device 104. The operator may receive an instruction at printing device to load calibrated paper 320. Once it is done, printing device 104 may inform color management server 106 that the paper is ready and to issue quality check 310.

In an alternate embodiment, if step 524 is no, the disclosed embodiments may monitor incoming print jobs to select a calibrated paper to use in the quality control operation. Thus, step 530 executes by monitoring job queue 322 for incoming print jobs that may use calibrated paper already loaded on printing device 104. As print jobs are added, the disclosed embodiments may check the paper or media required to determine if it uses calibrated paper. If so, then flowchart 500 may proceed to step 510 to insert quality check job with the identified print job, as disclosed above.

FIG. 6 depicts a flowchart 600 for performing quality control operations for a plurality of paper media according to the disclosed embodiments. Flowchart 600 may refer to FIGS. 1-5 for illustrative purposes. Flowchart 600, however is not limited by the embodiments disclosed by FIGS. 1-5.

Step 602 executes by determining a plurality of paper types that may be printed on printing device 104. Using FIG. 3, these papers may include calibrated papers 312, 314, 316, and 320 as well as paper 318 that is not calibrated. Color management server 106, for example, may query printing device 104 about its capabilities. Not every calibrated paper that can be printed on printing device 104 may be loaded thereto. Step 604 executes by identifying a media type for each paper type. The example media types corresponding to the calibrated papers and paper 318 is disclosed above.

Step 606 executes by checking a status of each paper type. Status may refer to whether calibration operations have been performed on the paper type such that a TRC and ICC profile is stored at printing device 104 for the type. Another status may be whether the paper type is loaded onto printing device 104. Step 608 executes by confirming that at least one of the plurality of paper types is calibrated. If none of the paper types are calibrated, then the quality control operation may not need to be executed according to quality control policy 302.

Step 610 executes by generating the quality control operation according to quality control policy 302. Such operations may be performed as specified during a window each day or according to a frequency 306 specified by quality control policy 302. The quality control operation will send quality check 310 to printing device to perform a quality check on one of the paper types loaded thereon. Step 612 executes by applying one or more rules 304 with regards to generating the quality control operation. These features are disclosed above. Given there should be a plurality of paper types loaded on printing device 104, the disclosed embodiments may apply a rule 304 to define how to select a paper type to use in the quality control operation.

Step 614 executes by selecting a first paper type based on rule 304. The first paper type corresponds to a calibrated paper having a media type. The rule relates to paper media of the first paper type. For example, a rule may rotate quality control operations between the different media types so that each paper type is checked periodically or according to a balanced or distributed schedule. It also may randomly select which media type to check. These features are disclosed above.

Step 616 executes by determining whether the selected paper type is loaded on printing device 104. The paper type should be available to print before receiving quality check job 330 of quality check 310. If no, then step 618 executes by selecting another, or second, paper type according to rules 304 of quality control policy 302. As disclosed above, job queue 322 may be analyzed to select a paper type for the quality control operation. Flowchart 600 returns to step 616 to determine whether the newly selected paper type is calibrated and loaded onto printing device 104.

If step 616 is yes, then step 620 is executed. Step 620 is disclosed by step 510 above. Step 622 is executed as disclosed by step 512 above. Step 624 is executed as disclosed by step 514 above. Step 626 executes as disclosed by step 515 above. Step 628 executes by updating the status of the checked paper type. As some rules determine how long it has been between checks, the updated status will help the disclosed embodiment select the best candidate for a quality control operation during the next quality check 310.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for implementing quality control for color printing, the method comprising:
   determining a quality control operation is to be performed on a printing device;
   querying the printing device whether a calibrated paper is loaded within the printing device, wherein the calibrated paper includes a media type;
   confirming the calibrated paper is available for the quality control operation according to a defined rule;
   submitting a quality check job for the quality control operation to the printing device;
   printing the quality check job on the calibrated paper at the printing device; and
   performing the quality control operation using the calibrated paper.

2. The method of claim 1, further comprising confirming the calibrated paper from a plurality of calibrated papers at the printing device.

3. The method of claim 2, further comprising selecting the calibrated paper from the plurality of calibrated papers according to the defined rule.

4. The method of claim 3, further comprising determining the calibrated paper has not been used for the quality control operation according to a parameter set forth by the defined rule.

5. The method of claim 1, further comprising, if the calibrated paper is not loaded at the printing device, querying a job queue for the printing device to determine whether a print job uses the calibrated paper.

6. The method of claim 5, further comprising scheduling the quality check job in conjunction with the print job.

7. The method of claim 5, further comprising, if the job queue does not include the calibrated paper, monitoring the job queue for the print job that includes the calibrated paper.

8. The method of claim 1, further comprising instructing an operator to load the calibrated paper at the printing device.

9. A method for performing quality control operations for a plurality of paper media, the method comprising:
- determining a printing device includes a plurality of types of paper, wherein each type of paper corresponds to a paper media;
- confirming at least one of the plurality of types of paper is calibrated;
- selecting a quality control operation for a first type of paper according to a defined rule, wherein the defined rule relates to the paper media of the first type of paper;
- submitting a quality check job for the quality control operation to the printing device;
- printing the first type of paper according to the quality check job; and
- performing the quality check operation using the first type of paper.

10. The method of claim 9, wherein the defined rule randomly selects the first type of paper from the plurality of types of paper.

11. The method of claim 9, wherein the defined rule selects the first type of paper according to a specified distribution of quality control operations among the plurality of types of paper.

12. The method of claim 11, wherein the specified distribution relates to the paper media for the first type of paper.

13. The method of claim 9, wherein the defined rule selects the first type of paper according to a time interval since a previous quality control check for the paper media of the first type of paper.

14. The method of claim 9, further comprising confirming that the first type of paper is not calibrated at the printing device.

15. The method of claim 14, further comprising selecting the first type of paper from a print job in a job queue at the printing device.

16. A color printing system comprising:
- a server configured to select a quality control operation for a printing device; and
- the printing device having a paper media type,
- wherein the server is further configured to
- determine the quality control operation is to be performed on the printing device,
- query the printing device whether a calibrated paper of the paper media type is loaded within the printing device,
- confirm the calibrated paper is available for the quality control operation according to a defined rule,
- submit a quality check job for the quality check operation to the printing device, and
- wherein the printing device is configured to
- print the quality check job on the calibrated paper; and
- perform the quality control operation using the calibrated paper.

17. The color printing system of claim 16, wherein the printing device includes a job queue having a print job for the calibrated paper.

18. The color printing system of claim 16, wherein the server is further configured to confirm the calibrated paper the paper media type is available at the printing device.

19. The color printing system of claim 18, wherein the server is further configured to select the calibrated paper from a plurality of calibrated papers according to the defined rule.

20. The color printing system of claim 16, further comprising a color measurement tool to perform the quality control operation.

* * * * *